United States Patent
Benzies

(10) Patent No.: US 11,875,471 B1
(45) Date of Patent: Jan. 16, 2024

(54) THREE-DIMENSIONAL ENVIRONMENT LINEAR CONTENT VIEWING AND TRANSITION

(71) Applicant: Build a Rocket Boy Games Ltd., Edinburgh (GB)

(72) Inventor: Leslie Peter Benzies, Edinburgh (GB)

(73) Assignee: Build a Rocket Boy Games Ltd., Edinburgh (GB)

(*) Notice: Subject to any disclaimer, the term of this patent is extended or adjusted under 35 U.S.C. 154(b) by 0 days.

(21) Appl. No.: 18/184,859

(22) Filed: Mar. 16, 2023

Related U.S. Application Data

(60) Provisional application No. 63/320,456, filed on Mar. 16, 2022.

(51) Int. Cl.
*G06T 19/20* (2011.01)
*G06V 10/74* (2022.01)
*G06T 19/00* (2011.01)

(52) U.S. Cl.
CPC ............ *G06T 19/20* (2013.01); *G06V 10/761* (2022.01); *G06T 19/006* (2013.01); *G06T 2219/2004* (2013.01)

(58) Field of Classification Search
CPC ............. G06T 19/20; G06T 2219/2004; G06T 19/006; G06V 10/761
See application file for complete search history.

(56) References Cited

U.S. PATENT DOCUMENTS

| | | | |
|---|---|---|---|
| 8,225,348 B2* | 7/2012 | Morris ............... | H04N 21/4756 725/47 |
| 2008/0215994 A1* | 9/2008 | Harrison ............... | A63F 13/42 715/757 |
| 2011/0225514 A1* | 9/2011 | Goldman ............... | G06T 19/00 715/757 |
| 2011/0225603 A1* | 9/2011 | Amento ............ | H04N 21/23412 725/12 |

(Continued)

OTHER PUBLICATIONS

Cheok et al. "Interactive Theatre Experience in Embodied + Wearable Mixed Reality Space", 2002, ISMAR (Year: 2002).*

(Continued)

*Primary Examiner* — YuJang Tswei
(74) *Attorney, Agent, or Firm* — SoCal IP Law Group LLP; Jonathan Pearce

(57) ABSTRACT

The present disclosure relates to a system for controlling an interactive virtual environment. The system includes a computer for generating a three-dimensional computer-generated environment including a player controllable character within the three dimensional computer-generated environment, displaying linear content on a virtual display presented within the three-dimensional computer-generated environment, the linear content associated with at least one interactive experience, receiving input controlling the player controllable character to move the player controllable character into close proximity to the linear content displayed on the virtual display, and generating a second three-dimensional computer-generated environment including the player (Continued)

controllable character within the at least one interactive experience associated with the linear content.

21 Claims, 9 Drawing Sheets

(56) References Cited

U.S. PATENT DOCUMENTS

| | | | | |
|---|---|---|---|---|
| 2012/0115597 | A1* | 5/2012 | Waugaman | A63F 13/31 |
| | | | | 463/31 |
| 2013/0038702 | A1* | 2/2013 | Schweitzer | H04H 60/33 |
| | | | | 348/51 |
| 2015/0143417 | A1* | 5/2015 | Zalewski | H04N 21/4781 |
| | | | | 725/34 |
| 2019/0208288 | A1* | 7/2019 | Mihajlovic | H04N 21/8456 |
| 2020/0133618 | A1* | 4/2020 | Kim | G06F 3/147 |
| 2021/0308578 | A1* | 10/2021 | Benzies | A63F 13/23 |
| 2021/0397846 | A1* | 12/2021 | Chang | G06N 7/01 |
| 2022/0124286 | A1* | 4/2022 | Punwani | G06F 3/04815 |
| 2022/0262080 | A1* | 8/2022 | Burton | G06V 40/67 |

OTHER PUBLICATIONS

Marcus et al, Design, User Experience and usability—Jul. 2019—Springer (Year: 2019).*

Veugen et al., Thinking out of the box (and back in the plane), 2008, eludamos (Year: 2008).*

Drew Davidson, WellPlayed 2.0—Video Games, Value and Meaning, 2010, ETC Press (Year: 2010).*

* cited by examiner

THREE-DIMENSIONAL ENVIRONMENT LINEAR CONTENT VIEWING AND TRANSITION

RELATED APPLICATION INFORMATION

This patent claims priority from U.S. provisional patent application No. 63/320,456 entitled "INTERACTIVE ENVIRONMENT LINEAR CONTENT VIEWING AND TRANSITION" filed Mar. 16, 2022, the entire content of which is incorporated herein by reference.

A series of applications both overseas and in the U.S. by the present assignee and naming the same inventor are relevant to the subject matter disclosed herein. The most-relevant U.S. application being application Ser. No. 17/265,124 filed Feb. 1, 2021 and entitled "System and Method for Providing a Computer-Generated Environment" claiming priority to Patent Cooperation Treaty application No. PCT/GB2019/052183 of the same title. Those applications are incorporated by reference herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to interactive three-dimensional computer-generated environments and, more particularly, to the viewing and interaction with two-dimensional linear content presented within such environments.

Description of the Related Art

There exist various ways for users to interact with computer user interfaces or interactive environments. As each new advancement in user interface or user interaction with computing devices occurs, it typically takes a few years for the appropriate physical interface to be developed or to take hold for interacting with that interface. In what is now quite an old example, Xerox developed a PARC user interface for its copiers and other devices in the late 1970s. One of the metaphors employed by the system was the use of so-called "windows." Initially, the interface was designed for touchscreen interaction, and a keyboard alone was found to be inadequate and clumsy for interaction with the user interface.

Within a short period after development of the windows metaphor, Xerox realized that the computer mouse, which could be used to move a cursor to a particular (x, y) location on a screen was the best way to interact with such a user interface. Virtually every operating system developed since has relied upon this same metaphor and user input device. More recently, Apple® acquired a company called FingerWorks in approximately 2005 for so-called "multi-touch" interactions. The underlying technology came to be used in virtually every iOS touchscreen to enable complex touch-based interactions on glass displays.

In a more recent vein, this development process is still ongoing in the ambit of virtual reality (VR) and augmented reality (AR) interactions. Virtual reality headsets have been around for years but have been complex and expensive. Now that they are hitting the mass marketplace, they are primarily being shipped with some form of controller. The best of those controllers rely upon infrared lighting to perform controller tracking to enable very detailed interactions in virtual space. Metaphors for "grasping" objects (e.g. a virtual ball in a virtual world) are developing using triggers and similar controller metaphors carried over from computer gaming. These metaphors and interactions are in the process of refinement and development.

However, even the strongest proponents of the use of hardware controllers look to a future where an individual user's VR hands will be tracked (by a headset or by an overall environment) and the user will interact with the virtual world in much the same way he or she interacts with the real world. Even with the best of infrared or visual hand-tracking systems, it seems inevitable that some metaphor that differs at least slightly from real-world interactions will be required for these virtual reality environments. Much like the introduction of the mouse in a "windows" environment, virtual reality and augmented reality software designers are actively working on the best and most natural ways to interact with a computing device in these new paradigms. The process of developing the human and machine interface for virtual and augmented reality is ongoing.

The metaphors for computer gaming on computers and video game consoles are well-developed. Users start software on a computer or gaming device to begin a particular experience. The controls for an on-screen avatar are relatively fixed. And, in a typical case, the gameplay mechanics and gameplay loop are relatively fixed. For example, in a first person shooter style game, a player avatar is usually controlled with a keyboard or an analog stick of a game controller, while an "aim" (typically the center of the screen) is controlled by the mouse or another analog stick. The mechanic is roughly: move the avatar around (in first or third person, depending on the game), aim the weapon at an enemy, fire the weapon and (hopefully) win a bout with other players or non-player characters controlled by the game.

A so-called "platformer" game mechanic involves moving a player avatar from platform to platform through a series of actions over a set arena or area to a "finish line" or other goal. Sometimes the metaphors are mixed, an first person shooter (FPS) with platforming elements, or a role-playing game with FPS elements and the like. But, in general, the mechanic and gameplay loop remain constant for a given game.

Some more complex games enable two or more gameplay mechanics in the same game. For example, the certain types of games include driving portions where a player controls a car (e.g. a car being stolen or moving the player avatar about a city) and also includes an FPS-like element where the avatar moves about in the city "walking" around. There may be flying portions wherein the player controls a flying plane or helicopter. There may also be dialogue options in such games that may change the overarching story or cause the game world to change in some way.

There are still other games or experiences built upon these basic concepts that enable various types of gameplay from the same controls and within the same "game." Roblox® is one such example. Roblox is a sandbox-style game that enables players to meet their "friends" online in one or more virtual worlds or environments. However, within Roblox, third parties may offer other experiences or games. These are typically quite simple games, but they alter the overall experience within Roblox. These other experiences remain within the overall construct, control scheme, and gameplay mechanics of the overall Roblox® experience.

As new gameplay mechanics and systems develop, interactive metaphors and control schemes likewise develop, usually with a short lag behind.

Figure 1:
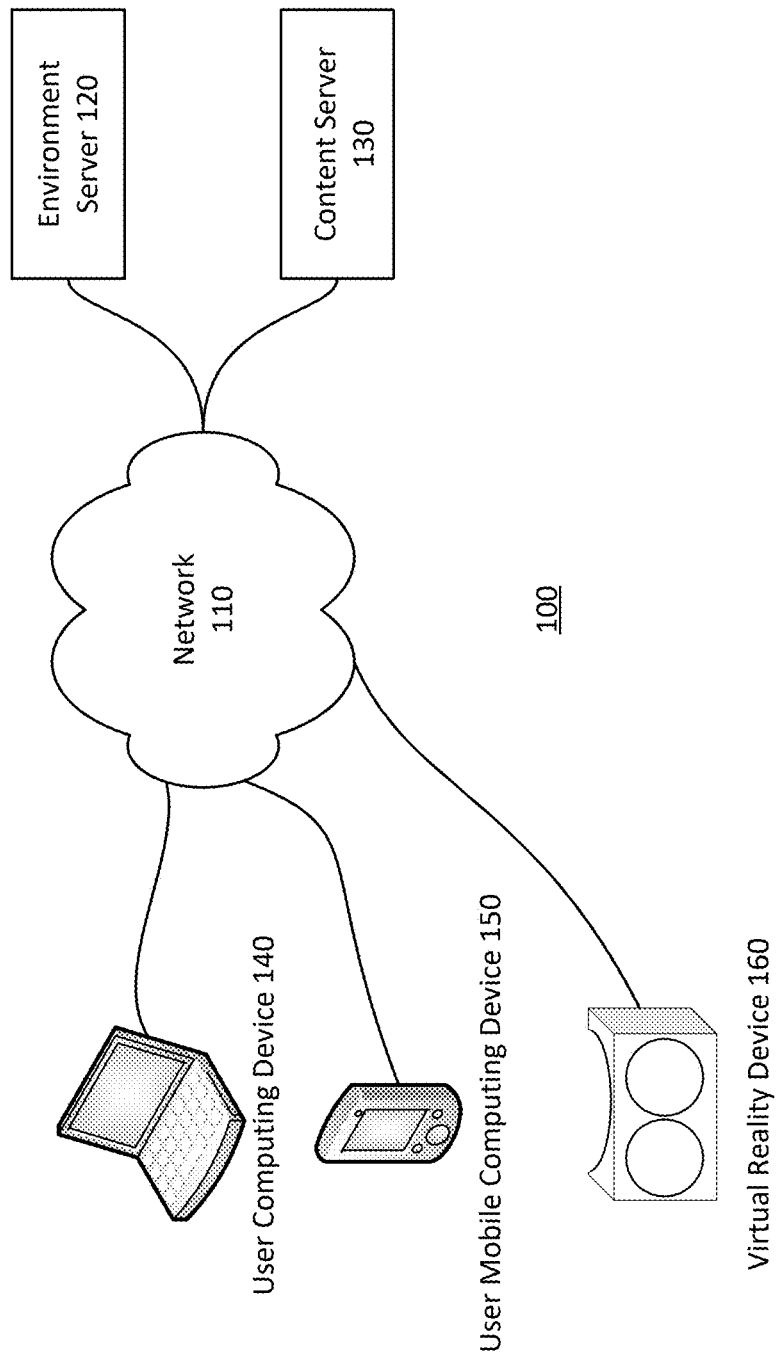
FIG. 1 is an overview of a system for three-dimensional environment linear content viewing and transition.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

There is increasing desire for a different kind of gameplay experience wherein a user may engage in any number of distinct gameplay or experiences while within or a part of an overall interactive environment. The user may transition seamlessly between a "hang out" experience and a "game" experience. Even the game experiences themselves may vary, all while within one three-dimensional environment or experience. One metaphor is the use of a virtual VR headset within a given interactive experience as a "gateway" to another interactive experience. The metaphor employed is the player avatar donning the VR headset within the first interactive experience to move into another interactive experience. Likewise, the player avatar may remove one VR headset to move back into a prior interactive experience.

In-game content may be viewed on virtual "screens" within the interactive experience. So, a player avatar may stand or sit in a virtual living room or theater, watching a virtual television which is a live stream of that player's friend playing a game that is a sub-part of the overall interactive experience. In one example, a first-person shooter game being viewed (similar to a video game stream) on a large virtual movie theater screen within a virtual movie theater.

However, the experiences within the interactive environment are many. And the metaphors used for transition from one experience to the next may vary depending on the context. So, in a first person shooter "match" style game, a user may load-in to a game by starting the application and logging into a service. But, a game like Apex Legends® "drops" players into the game world from an airdrop rather than merely having them appear in set or random locations within the game world. So-called "open world" games often have a player "home" or base location where the user returns to store collected materials and repair cars or sleep for the night as a save mechanic. Further, video game players in particular like to experiment and try different approaches to an interactive environment.

Here, one or more player avatars may engage in an interactive experience. That experience may be on a personal computer, a gaming console, through a streamed "game" experience (e.g. Xbox Cloud, Nvidia Now, etc.), a VR headset, or other systems for enabling interactive entertainment. That interactive experience may incorporate in some form a stream of linear content. As used herein, "linear content" is two-dimensional recorded, live, or streamed content that is intended to be viewed from a beginning point to an end point, customarily without any form of user interactivity with that linear content, apart from potentially starting and stopping or pausing playback. Linear content is typically of the form of a video of a motion picture, a television show or series, a so-called "short" or may be a trailer for other content, or a pre-rendered cutscene. Linear content is explicitly not a rendered three-dimensional world in which a character or player may move about freely and with which the player may interact.

However, Linear content may be displayed on a virtual display within a three-dimensional environment or other interactive experience. So, a user or series of users within that three-dimensional environment may view that linear content. One such metaphor may enable an individual or group to watch linear content in such a virtual living room or movie theater. Within the three-dimensional environment, the content may be projected onto a large screen or within a movie theater while the participants watch together. The screen or display may itself be a "pop-up" display placeable by a player avatar anywhere within the world or it may be fixed (e.g. a jumbotron at a stadium or during a concert or simply always present).

Linear content may have a purpose, a theme, be related to a franchise or series, involve a particular superhero or crime-fighting team or character, be set in a particular world (e.g. Star Wars® or a Transformers® movie or series), involve a particular skill set or activity (e.g. skiing or cooking or skydiving) or otherwise involve some activity or be related to some other content or world. The content may be a dynamic screen that displays live content created by or taking part from a "streamer" of such content or even player friends currently playing a different experience within the three-dimensional environment (e.g. engaged in an FPS game or a racing game). A user may watch that content alone or with friends within the same interactive environment.

As the user watches the linear content, the user may wish to "join" the environment, world, characters, activity or the like for that linear content. Or the linear content may itself be an advertisement or invitation to participate in such an activity. In such a case, a player may control his or her player avatar so as to cause that player avatar to jump into, step into, or otherwise move through the linear content on the virtual display (e.g. television screen, theater screen, portal, etc.) to thereby move into or begin interacting with an interactive environment.

As used herein "associated with" in the context of a three-dimensional environment associated with linear content means that the three-dimensional environment "associated with" the linear content is somehow related to that linear content. In particular, the new three-dimensional environment or one "associated with" linear content is one which involves the same theme, world, characters, actions, activities, or elements from the linear content shown on the display. The three-dimensional environment "associated with" linear content is explicitly not generic content or merely another part of an existing game world or environment, it is a new environment with specific reference to or components from the linear content, but rendered as a part of the three-dimensional environment.

In so doing, the player may thereby indicate his or her desire to enter a new experience involving the theme, world, characters, activity, etc. for the linear content. The linear content can play the part of the transition space from a first three-dimensional environment to a second three-dimensional environment, the second having some relationship or association with the theme, setting, characters, or the like for the linear content being viewed on the display. The computer system may automatically and seamlessly transfer the player avatar (or generate a different, but related player avatar—e.g. a car for a racing game or Fast & Furious® linear content) to the different interactive experience associated with the linear content.

So, for example, a user may watch a cooking show (linear content) in a virtual kitchen within an interactive experience in which the player avatar is situated. Partway through the process of watching a chef prepare chicken piccata, a player may move his or her avatar into the display upon which the linear content showing the chicken piccata preparation is being shown. The system may cause the player avatar to transition to a different three-dimensional environment involving a kitchen and cooking game wherein a player may cook a virtual chicken piccata or simply take part in a simplified (or complex) cooking game or experience. Alternatively, a user may be transmitted to a virtual store where real-world ingredients to prepare chicken piccata may be purchased for pick up or delivery to that user's home.

The content may be branded or associated with a particular set of linear content. So, for example, a user may be watching one of the John Wick series of movies starring Keanu Reeves. A user may particularly like a given scene or a scene within the linear content may indicate that an interactive experience is available for the scene. So, for example, a scene within the movie involving a dramatic set of action sequences may indicate that an interactive experience is available. The user may wish to "participate" in this scene by jumping into the associated interactive experience. By "jumping" into the display showing the linear content as that scene plays, the user may indicate that intent and be transitioned to the playable experience.

The system described herein improves the functioning of the computer by streamlining the interaction of users within a three-dimensional environment to better-mimic how a user would choose to interact in the real world. In essence, the present system improves the functioning of the server system for interactive environments like those described herein by easing transition between content types and experiences. In the past, a user may launch a particular game software. To transition to a new game software or experience, the user must quit that game software and launch another game software. The present system streamlines that process by enabling seamless transition between content of disparate types through the use of a "teleport" like metaphor.

The present system also improves the interactivity of linear content. For many years, linear content such as film and television shows have desired to have more engagement with their fans. Many films and television shows have associated video games, but they generally only have the same characters and rough similarities of the storylines or themes. The present system can enable linear content creators to have direct interaction with their fans and customers through interactive experiences directly tied to their linear content. Creative linear content creators can even use the present systems to tailor linear content to user's desires or according to user interactions with an associated three-dimensional environment while viewing that linear content.

Description of Apparatus

Referring now to FIG. 1, an overview of a system 100 for three-dimensional environment linear content viewing and transition is shown. The system 100 includes an environment server 120, a content server 130, a user computing device 140, a user mobile computing device 150, and a virtual reality device 160; all interconnected by a network 110.

The environment server 120 is a computing device (FIG. 2) or a group of computing devices. The environment server 120 is used to store three-dimensional models and any textures associated with the various three-dimensional models. These models may be player characters, environments in which the models move about, virtual automobiles, clothing, furniture, buildings, means of transport, displays, plants, and components of each of the foregoing.

The environment server 120 may act much like a traditional "game server" to provide a server into which one or more players may log in order to move about in a virtual world comprised of the associated art assets, models and textures. The environment server may primarily operate as an orchestrator of multiple players as they connect and interact with one another, and to ensure integrity of the process of login, and uniformity of the three-dimensional environment (which may actually be rendered locally on each user's machine from a set of game assets and files).

The environment server 120 may be self-hosted, meaning operated by a company or entity that enables the functions and systems described herein. Alternatively, the environment server 120 may be on a shared resource service such as Amazon AWS or Microsoft Azure. Some or all of the environment server 120 may be hosted by the users of the system itself (e.g. a "chat" room made by players) so that users join their computer. In such cases, the environment server 120 or a portion thereof may actually be peer-to-peer hosted by one of the participants and merely orchestrated or controlled by a player.

The content server 130 is a computing device or a group of computing devices. The content server 130 stores and streams linear content for display on a fixed or movable display within the three-dimensional environment created by the environment server 120. So, the content server 130 may be a streaming service like Netflix® or Hulu®. However, in some cases the content server 130 may be or be a part of the environment server 120. This may be the case, for example, when the environment server 120 is used to display a linear content version of an ongoing game (e.g. a stream of an first person shooter (FPS) game or massively online battle arena (MOBA) game being played elsewhere within the environment). Or, in other cases, the content server 130 may be one or more of the user's computing devices. So, a user may host a "movie night" by streaming a film or television show from their local library or together with a friend from an online streaming service. In such a case, the content server 130 may be locally hosted by a user.

The user computing device 140 is a computing device such as a personal computer, laptop computer, desktop computer or the like. The user computing device 140 may be a typical consumer computing device, lacking in any significant specialized capabilities. However, the user computing device 140 may include a GPU or an integrated GPU (e.g. integrated into a single chip with a CPU). The user computing device 140 is used by a user to connect to the environment server 120 to move an avatar about within a three-dimensional environment generated by the environment server 120 (or, more accurately, on the user computing device 140 as directed by the environment server 120). The three-dimensional environment to which the user connects may enable that user to carry about a "pop-up" display for linear content that may be placed anywhere or virtually anywhere within the three-dimensional environment. The three-dimensional environment itself may incorporate one or more display screens for display of linear content thereon built-in to the environment (e.g. large billboards, virtual "television" monitors, and the like).

The user mobile computing device 150 is effectively identical to the user computing device, though its form factor may be that of a mobile device. It may, for example, be a mobile phone, a smart phone, a tablet computer, or other, similar device. It is shown to indicate that in some cases a user mobile computing device 150 may be used in place of the user computing device 140. Likewise, the virtual reality device 160 is another computing device that operates in much the same way as the user computing device.

Figure 2:
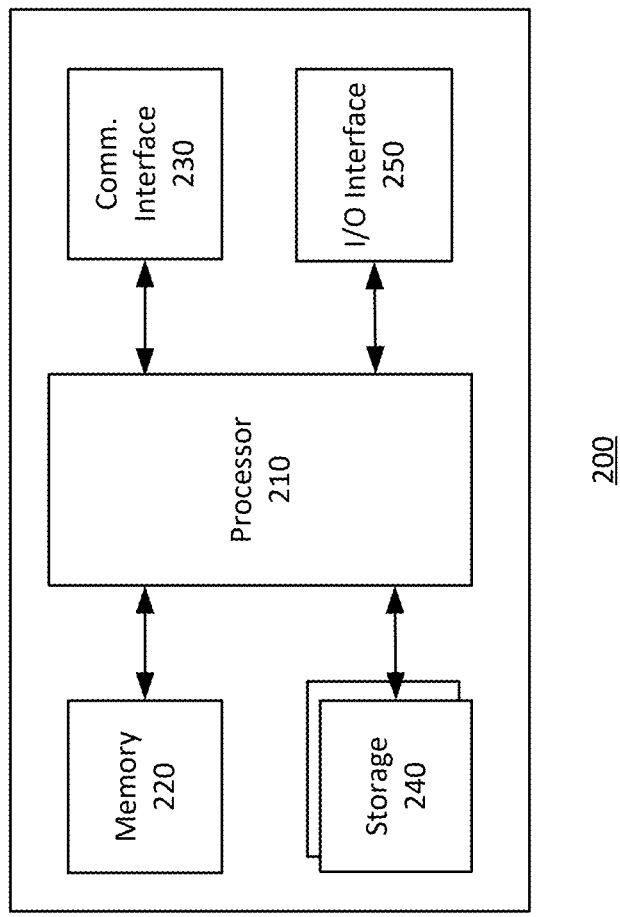
FIG. 2 is a block diagram of an exemplary computing device.

FIG. 2 is a block diagram of an exemplary computing device 200, which may be or be a part of the environment server 120, the content server 130, the user computing device 140, the mobile computing device 150 or the virtual reality device 160 of FIG. 1. As shown in FIG. 2, the computing device 200 includes a processor 210, memory 220, a communications interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the input/output interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals. The application can perform the functions described herein.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as coding/decoding, compression/decompression, and encryption/decryption as necessary for communicating with external devices using selected communications protocols. The communications interface 230 may rely on the processor 210 to perform some or all of these function in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices. The processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage media in a storage device included with or otherwise coupled or attached to a computing device 200. That is, the software may be stored in electronic, machine readable media. These storage media include, for example, magnetic media such as hard disks, optical media such as compact disks (CD-ROM and CD-RW) and digital versatile disks (DVD and DVD±RW), flash memory cards, and other storage media. As used herein, a storage device is a device that allows for reading and/or writing to a storage medium. Storage devices include hard disk drives, DVD drives, flash memory devices, and others.

Figure 3:
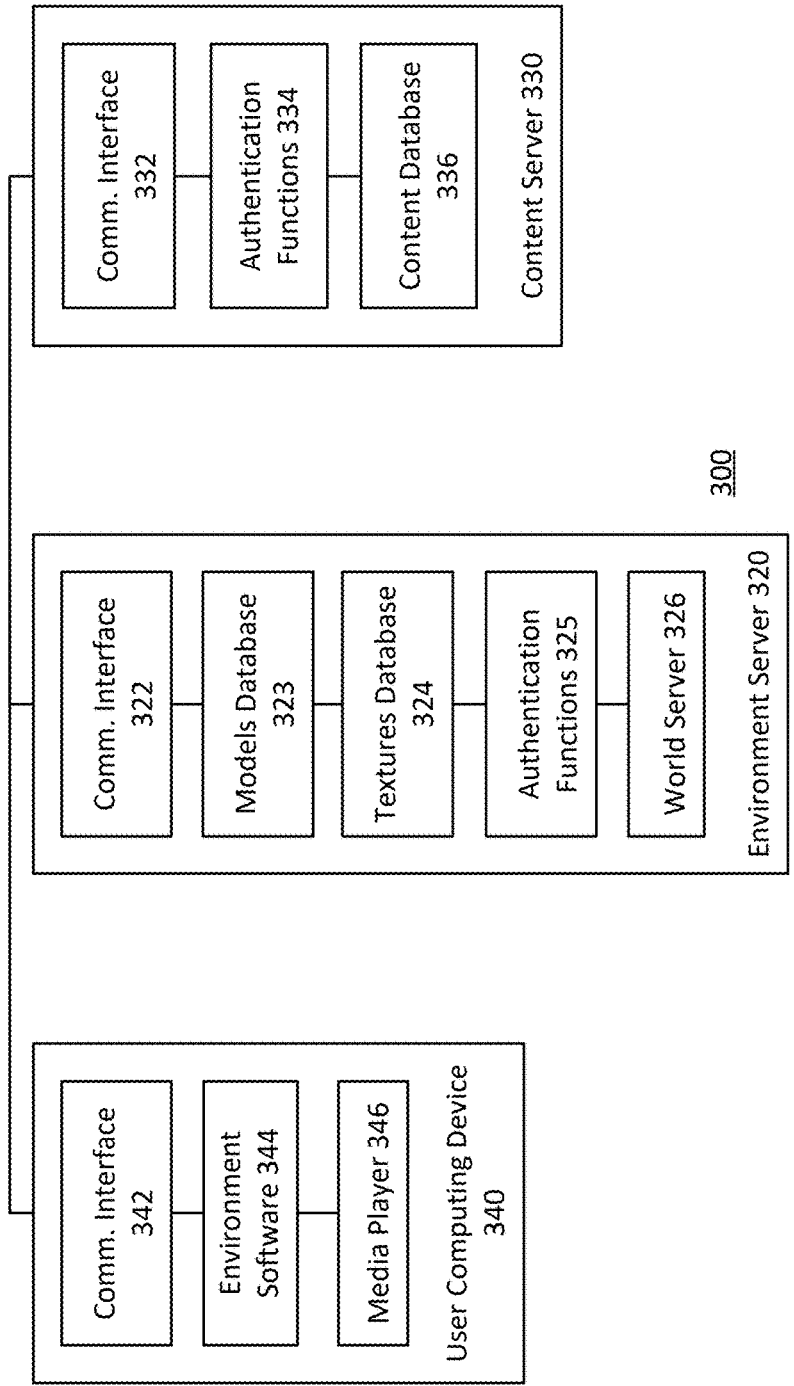
FIG. 3 is a functional block diagram of a system for three-dimensional environment linear content viewing and transition.

FIG. 3 is a functional block diagram of a system 300 for three-dimensional environment linear content viewing and transition. The system 300 includes the environment server 320, the content server 330, and the user computing device 340. The environment server 320 may be a version of environment server 120, the content server 330 may be version of server 130, and the user computing device 340 may be a version of device 140, 150 or 160. The mobile computing device and virtual reality device are not shown because their functions are substantially the same as the user computing device 340. These are functional elements, expressed in terms of their functionally. The functional elements shown in this figure may be physically divided or organized differently than shown from a functional perspective while still conforming to the overall intended functionality and purposes. The functions shown in this figure may be implemented in hardware or software or a combination of the two.

The environment server 320 includes a communications interface 322, a models database 323, a textures database 324, authentication functions 325, and a world server 326.

The communications interface 322 operates to enable communications between the interacting elements of the system like the content server 330 and the user computing device 340. The communications interface 322 may include the various hardware network components discussed above as a part of the computing device 200. However, it also may include application programming interfaces (APIs), unique network connectivity systems and data protocols used by the user computing device 340 and/or content server 330 to communicate with the environment server 320 securely and efficiently under the unique circumstances of the system 300.

The models database 323 stores the three-dimensional models used to generate the three-dimensional environment. These models may be the maps of the world, the locations, the objects making up the world (e.g. cars, boats, trees, tables, chairs, clothing, etc.). The models database 323 also stores the models for the player avatars used within the world by all of the players. These avatars may be uniquely-designed individually by each player or may have elements drawn from groups of "components" making up the avatar bodies (e.g. sets of eyes, sets of arms, sets of legs, etc.).

The textures database 324 stores the textures used in conjunction with the three-dimensional models stored in the models database 323 and used the generate the three-dimensional environment. The textures are applied by a three-dimensional engine to generate models with associated "skins" on those models. The textures appear as skin, clothing, tile on floors. Moving textures can even appear as television-like elements within the world or as animations on cars, avatars, and other elements of the generated three-dimensional environment.

The authentication functions 325 ensure that users (e.g. using user computing device 340) logging into the environment server 320 are properly authenticated. This may be as simple as a typical login function with a password, but may also employ two-factor authentication, fingerprint authentication, or other, secure methods. This is in part because the accounts associated with a given user or player in a given environment may have some value, may be sold or traded to others or may simply represent a great deal of time, effort, and investment on the part of the player. The type of ever-present world available in some forms of three-dimensional environments, such as so-called metaverse environments, can engender significant attachment to or identification with a player avatar. So, players may wish to have as secure a login process as possible to make sure that their avatars, and any digital belongings associated with that avatar, are secure.

The world server 326 orchestrates the other components of the environment server 320 to enable users connected to the environment server 320 to operate to generate the three-dimensional environment for users connected to the environment server 310. The world server 326 may operate in much the same way as a game engine or network game server operates. Though shown as a single server, it may be many physical servers. The world server 326 enables multiple users to connect to the environment server 320 to experience the same game world or three-dimensional environment simultaneously. To accomplish this, the world server 326 ensures authentication has taken place, loads the models and textures from the model database 323 and the texture database 324, and maintains an updating state for the overall game including player locations and movements and animations within the three-dimensional environment.

The world server 326 may simultaneously operate multiple world "types" so that users can transition from, for example, racing game to fighting game to "hang out" area to special linear content experience (discussed below), and so on. In this way, a single or multiple servers may be employed. In cases with a larger server population or particular game types that are overpopulated, sharded servers may be employed to load balance the total user population in a given area or on a server. The world server 326 may dynamically allocate and deallocate physical server capacity dependent upon the current load or need either in aggregate or for particular experiences.

In cases where linear content is streamed or otherwise shown within a three-dimensional environment, the world server 326 may operate to apply linear content from the content server 330 to a portion of the three-dimensional environment (e.g. a display or screen within the virtual world) so that the content may be viewed or viewable "in" the three-dimensional environment.

The content server 330 includes a communications interface 332, authentication functions 334, and a content database 336. Though shown as a single content server 330, there may in fact be many content servers, each hosted separately from one another. In other case, the user computing device 340 itself may be a content server 330 as well as operating to access linear content.

The communications interface 332 is primarily used to communicate requests for particular linear content from the user computing device 340 or the environment server 320 and to transmit the linear content requested to the environment server 320 and/or user computing device 340. The communications interface 332 may include the various hardware network components discussed above as a part of the computing device 200. However, it also may include application programming interfaces (APIs), unique network connectivity systems and data protocols used by the user computing device 340 and/or environment server 320 to communicate with the content server 330 securely and efficiently under the unique circumstances of the system 300.

The authentication functions 334 operate much the same as the authentication functions 325 of the environment server 320. However, these authentication functions 334 may be distinct from those of the environment server 320 in that they may involve authentication with a third party service (e.g. Netflix®) where streamed linear content or otherwise stored linear content is available for access. So, a user may be required to separately authenticate with a particular content server 330 in order to access the content database 336 and provide that data or that streamed content to the environment server 320 and the user computing device 340 for viewing. Accordingly, the authentication functions 334 may be implemented by a third party or rely upon the exchange of keys between the content server 330 and the environment server 320 and the user computing device 340 to enable the system 300 to operate to access linear content stored on the content server 330.

The content database 336 is a database storing the linear content for viewing by the user computing device 340 and/or the environment server. The linear content is preferably of a type that is suitable for streaming, reliant upon built-in redundancies in the encoding such that it may be readily streamed or transmitted over a network. Various forms of video content, particularly designed for compact, efficient encoding and streaming are known to those of skill in the art. Examples of suitable encoding schemes include H.264 and H.265.

The user computing device 340 is a computing device used by a user to access the environment server 320 and the content server 330. The user computing device 340 is shown as only a single device for example purposes, but a single environment server 320 and content server 330 can service numerous (hundreds or thousands) of simultaneous connections and interactions with user computing devices like user computing device 340. The user computing device 340 is commonly a desktop or laptop computer, but may be a mobile device or a virtual reality device or similar computing device. The user computing device 340 includes a communications interface 342, environment software 344 and a media player 346.

The communications interface 342 is primarily used to enable interaction of a player's avatar and software with the environment server 320 and to obtain and stream content from the content server 330. The communications interface 342 may include the various hardware network components discussed above as a part of the computing device 200. However, it also may include application programming interfaces (APIs), unique network connectivity systems and data protocols used by the user computing device 340 to communicate with the content server 330 or with the environment server 320 securely and efficiently under the unique circumstances of the system 300.

The environment software 344 is software for presenting the three-dimensional environment served by the environment server 320 to the user computing device 340. Traditionally, the environment software 344 would be an implementation of a "game engine" software that integrates three-dimensional models, textures for those models, scripting to enable functions and interaction within the three-dimensional environment, and various other functionality taking place within the environment server 320. The environment server 344 preferably integrates the authentication functions used by authentication functions 325 and 334 to enable the environment server 344 to access the world server 326 and content database 336 to enable the functions discussed herein. In a simplified sense, user may move a three-dimensional avatar about in a three-dimensional environment, interact with the environment, and may stream or otherwise access linear content served by the content server 330 from within the three-dimensional environment. Thereafter, the user may transition the player avatar to a new three-dimensional environment based upon interaction with the linear content displayed within the three-dimensional environment.

The media player 346 is software designed to play linear content. This software may be specialized in the sense that it operates within the three-dimensional environment shown on the user computing device 340 so that a user may view the linear content played by the media player 346 from within the three-dimensional environment, for example, on a virtual television display, a billboard or otherwise on a "screen" within the three-dimensional environment for viewing by those users (each connected via one of the user computing devices 340) within the three-dimensional environment.

Figure 4:
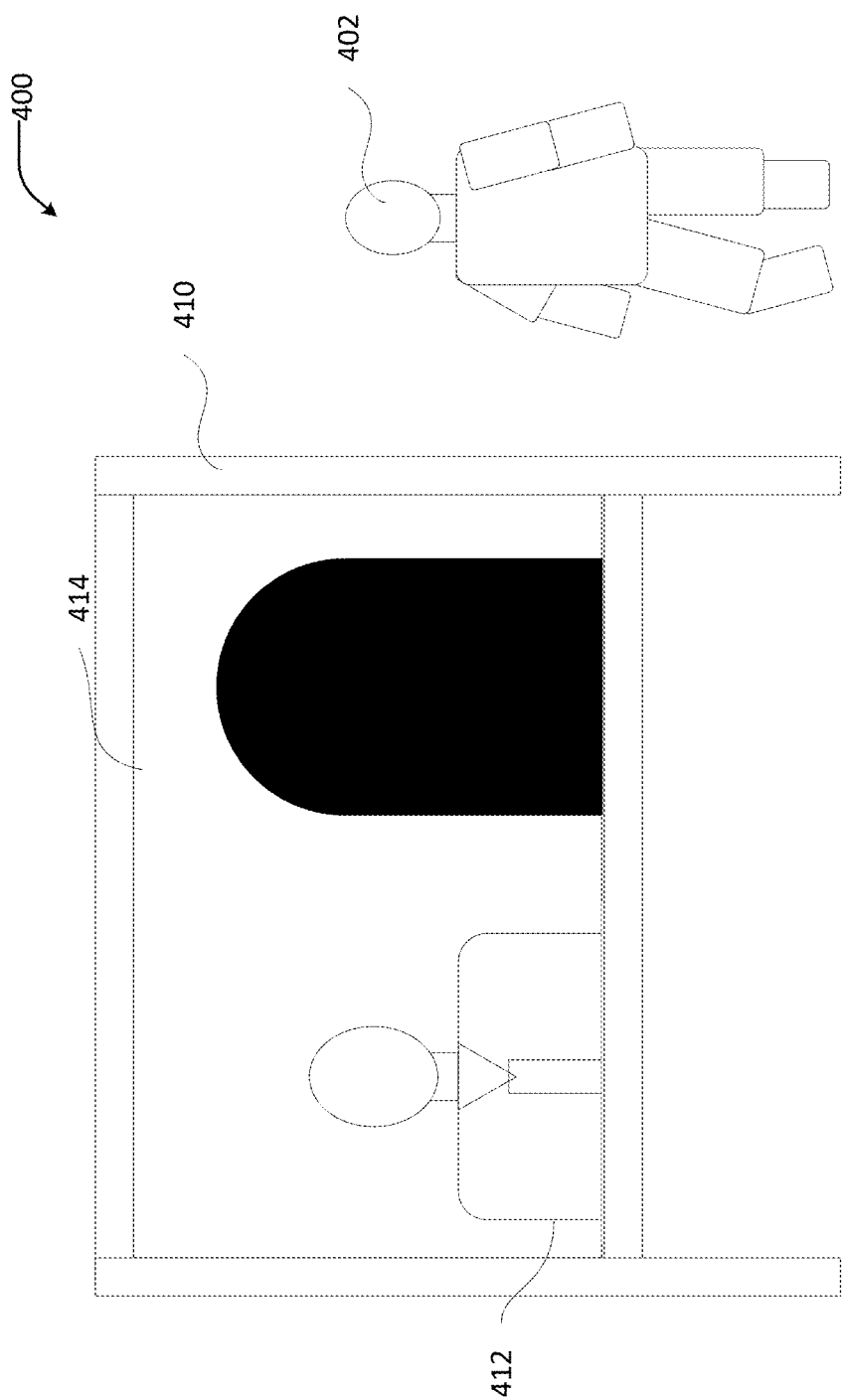
FIG. 4 is an example three-dimensional character near a linear content display.

FIG. 4 is an example three-dimensional character in close proximity to a linear content display. As used herein "close proximity" means within a radius equivalent to 2-5 meters of a display showing linear content. Close proximity explicitly includes walking into, through or jumping into or through the display 414. The three-dimensional environment 400 includes the three-dimensional character 402 which may be an avatar of the player character. A display 410 is present within the three-dimensional environment 400. The display 410 is showing linear content 414 that is a scene (e.g. a scene from a film) including an actor playing a character 412 on the display 410.

The display 410 may be a fixed display within the location in the three-dimensional environment 400. Or, the display 410 may be a movable display, associated with the three-dimensional character 402 which the player may "set up" anywhere within the three-dimensional environment 400 for viewing of linear content. The display is a "virtual" display in the sense that it is not an actual computer display within the real world, it is a display showing linear content within a three-dimensional environment.

The display 410 may show or display linear content 414 as desired by or directed by the user associated with the three-dimensional character 402 within the three-dimensional environment 400. Alternatively, the display 410 may play linear content 414 selected by another player, by the three-dimensional environment themselves, by an advertiser or from a particular service or good (e.g. a streaming service may show content or advertisements for content like trailers for films) within the three-dimensional environment.

An indicator within environment 400 and associated with the linear content 414? May inform the player that the linear content shown on the display 410 is able to be joined by engaging with the linear content 414. This indicator may be a green light, may be a text or other indicator that appears when a user "mouses over" (e.g., using a mouse, keyboard or VR headset positioning or interaction) the display as alternative text, or may be more or less direct an indication. For example, the indication may be words appearing on screen that indicate a given scene of linear content may be "joined" or saying that "there is an interactive scene associated with this scene" which may appear on the screen. A particular icon or indicator image may appear on the display, environment 400 or on the user's computing device indicating that the scene is one which includes an associated three-dimensional environment. In other cases, the interactive element available to the user as a three-dimensional environment associated with the linear content may be a so-called "easter egg" that is only discoverable by accident or through experimentation with the display as the entire linear content plays. And, more basically, if a display is showing no content at all, there can be no associated three-dimensional environment associated with no content.

Only certain portions of time or area (e.g. a door or window) within the linear content may be associated with related interactive or immersive three-dimensional experiences. So, only certain scenes in movies may have one or more three-dimensional environments associated therewith. In other cases, an entire linear content (e.g. an entire episode of a television show) may be associated with a single three-dimensional environment recreating that scene or augmenting that scene or enabling the player character to interact with the scene within a three-dimensional environment. In some cases, or for certain time periods, the linear content may be associated with a particular three-dimensional experience.

So, by way of example, a linear content Simpsons episode associated with Homer's experiences in the nuclear power plant may include a portion of the linear content that is a single experience wherein a player can take on the role of Homer as he goes about his job working in the Springfield nuclear power plant, engaging in a mini-game. Alternatively, the Simpsons episode or every episode may be associated with a full-length commercial video game such that interacting with the display 410 causes the player character to enter a demonstration version of the new Simpsons video game to be played through the entire demo. In this way, the player may be encouraged to purchase or otherwise obtain the associated Simpsons game.

Further examples of portions of the linear content could include the display of a trailer for an upcoming film that plays on a display shown in a prominent location within the three-dimensional environment. The trailer may be for an upcoming action film. Player character engagement with the display 410 may cause the player three-dimensional character 402 to transition to a new three-dimensional environment which is a recognizable portion of the world or experience from the associated universe of the film. So, for a Marvel trailer, the experience may involve interactions with Spiderman or a mini-game swinging from spider webs in New York. Or, for a film involving dramatic action sequences of racing or shootouts, the player avatar may be placed into the world of the film and take the wheel of a fast car within a racing game or may be involved in a shootout within a game world that mirrors the scenes shown in the trailer.

In this way, the player may be drawn more into the "world" or environment of the linear content to experience some aspect of that world or environment. From a user perspective, this enables the player to have a deeper connection to and interaction with the world than merely watching the linear content. From the intellectual property owner of the linear content perspective, the user engagement with their television series, film, or other linear content increases interest in the content and buy-in from one or more desired consumers of that content.

Similarly, the linear content may be a replay of a video game competition that took place earlier or that is taking place live. It may also be a stream of a video game currently being played by a friend of the player. In such a case, the user may watch the stream and be encouraged to engage in the video game. Interaction with the display 410 may cause the player three-dimensional character 402 to join the live game with their friend or, in the case of an ongoing video game competition, to merely join or gain access to a lobby or demonstration version of the game or, if the game is already owned, to begin playing the game shown on the display 410. In this way, players may be reminded by the linear content that they enjoy a particular game or may enjoy it and may be invited to join it easily and quickly with limited or no interaction outside of the three-dimensional environment.

As used herein the phrase "new three-dimensional environment" or "non-linear three-dimensional environment" or "three-dimensional experience" mean three-dimensional environments, other than a general or baseline game world or three-dimensional environment, and instead are those that are expressly associated with a specific linear content or portion of a linear content. The experiences that a player three-dimensional character 402 joins may be mini-games, full video games, or may be purpose-built versions or iterations of scenes within the linear content designed to allow a player to "experience" the world of the linear content. Once the player has completed the three-dimensional experience, the player may return to the original three-dimensional environment.

Figure 5:
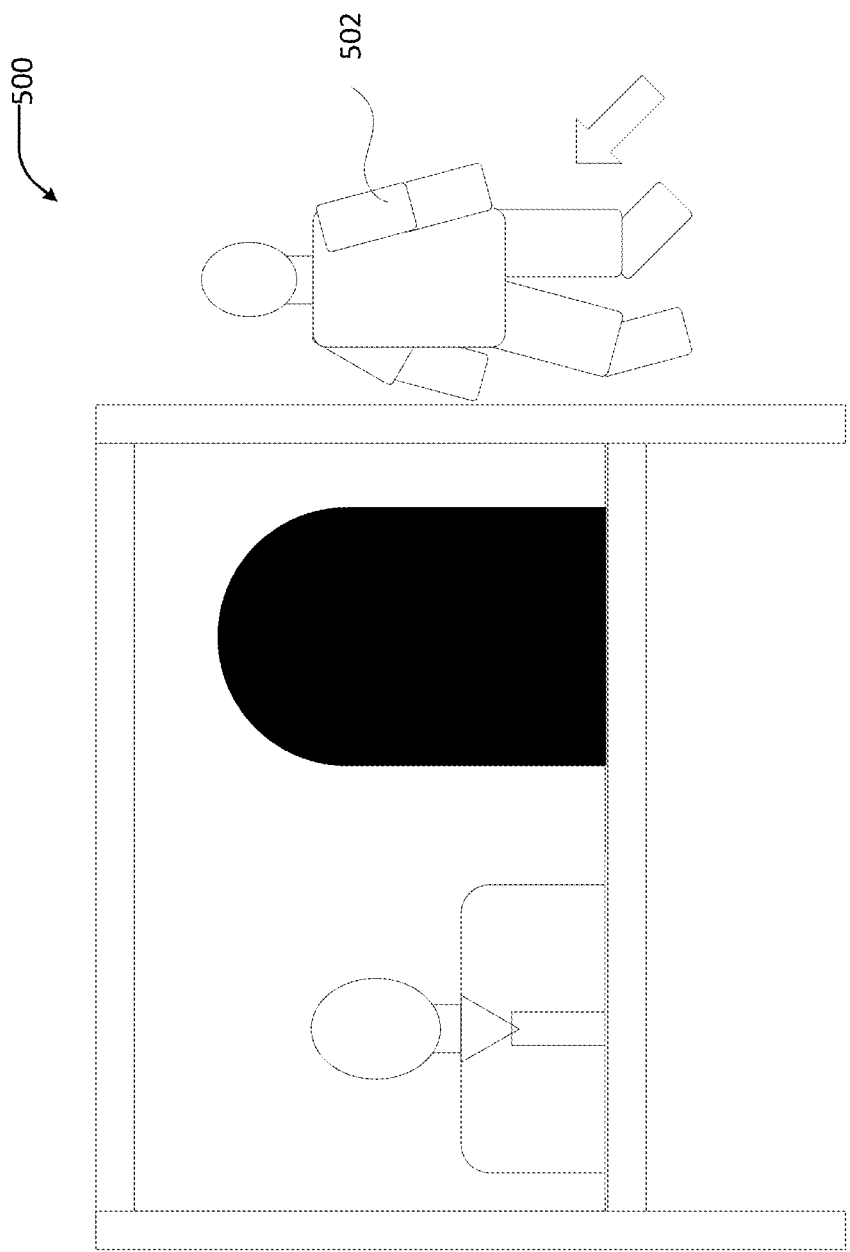
FIG. 5 is an example three-dimensional character jumping into a linear content display.

FIG. 5 is an example three-dimensional character jumping into a linear content display. Here, the player three-dimensional character 502 has moved closer to the display within the three-dimensional environment 500, indicating a desire to join the three-dimensional experience associated with the linear content. This action is "jumping into" the linear content?, but the particular interaction may be slightly different. The action triggering the indication of a desire to join the three-dimensional environment associated with the linear content may be merely moving close to the display, walking toward the display, "touching" the display (e.g. by interacting with the display), or walking into or through a nearby portal or doorway associated with the linear content. Preferably, no click or selection or menu operation is necessary for a user to complete the action of transitioning to a new three-dimensional environment associated with the linear content. Instead, the interaction is simplified through the use of the "move into" or "jump into" metaphor.

Figure 6:
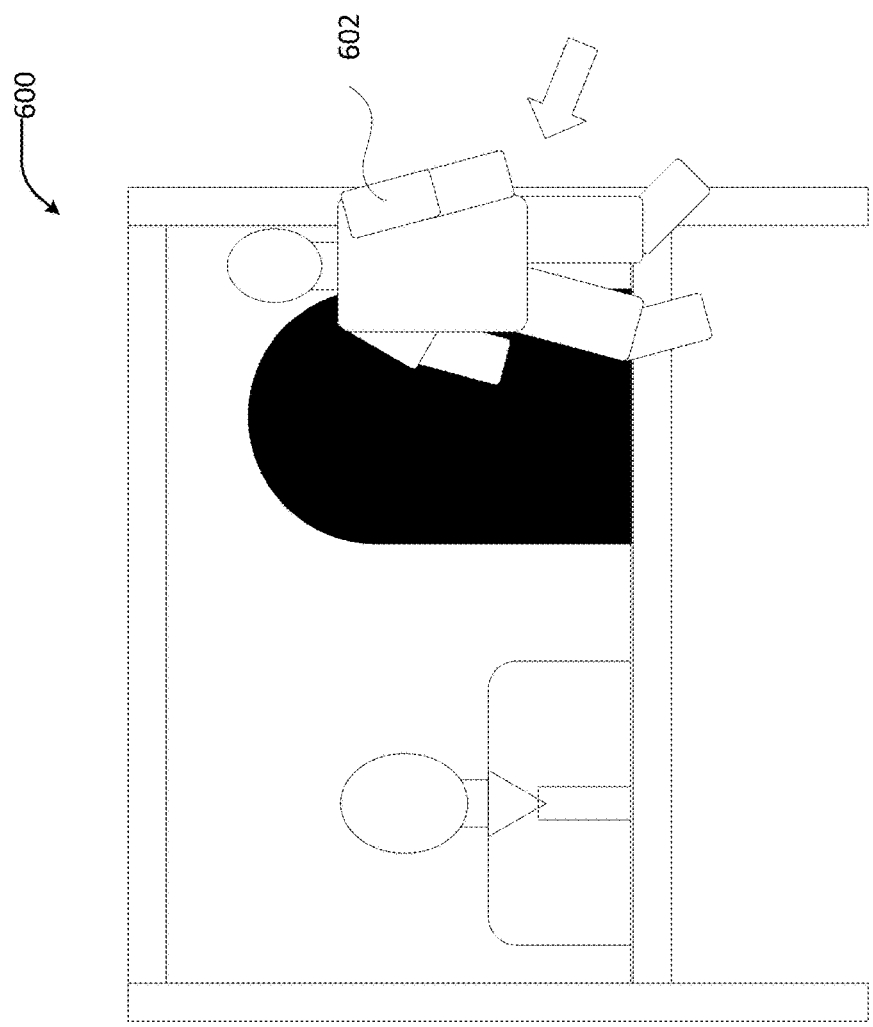
FIG. 6 is an example three-dimensional character jumping into a linear content display.

FIG. 6 is an example three-dimensional character jumping into a linear content display. Here, the player three-dimensional character 602 has nearly jumped "into" and continues jumping into the display showing the linear content within the three-dimensional environment 600. The character 602 may continue jumping into the linear content or display showing that content by moving any part of the character into or over the area of the linear content or display of that content.

Figure 7:
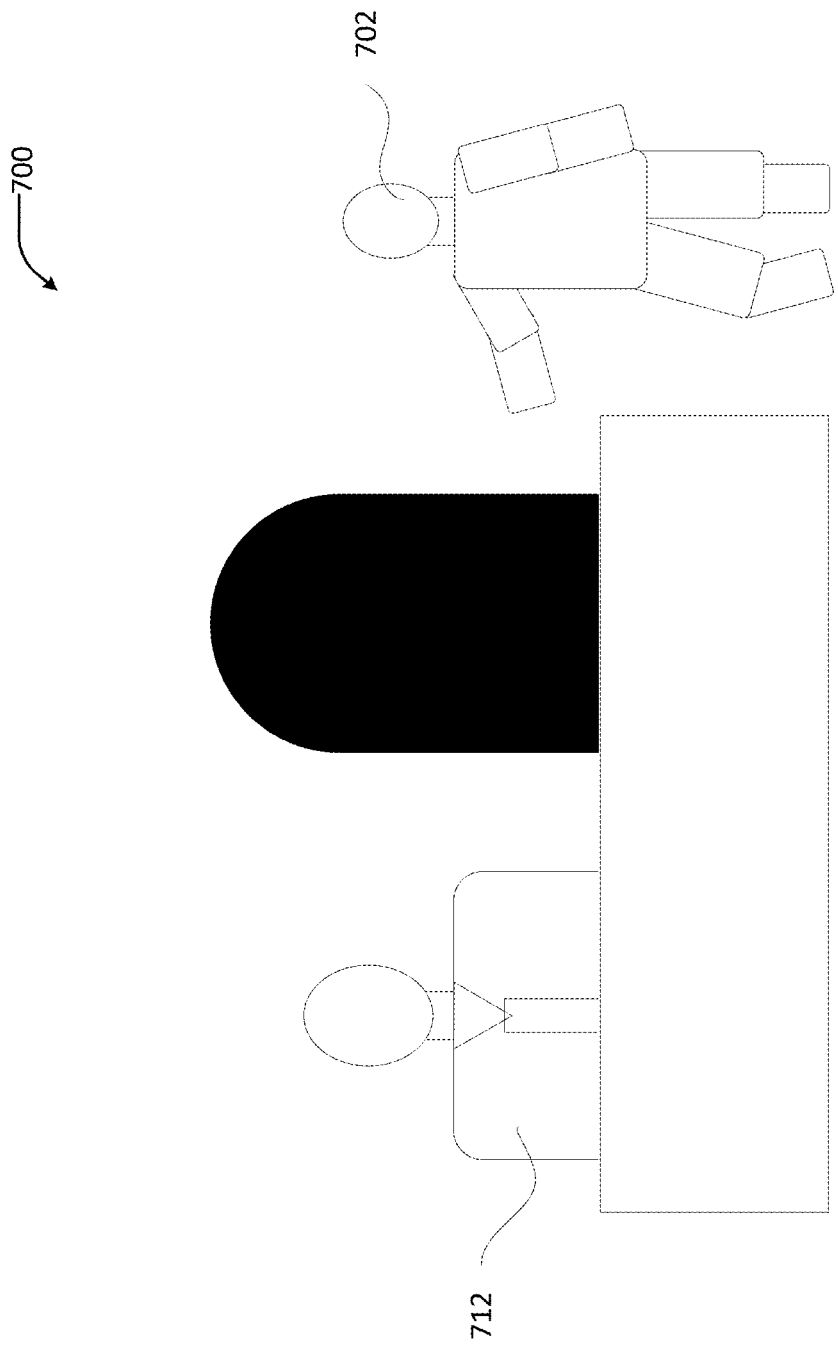
FIG. 7 is an example three-dimensional character transitioned into a new three-dimensional environment previously shown on the linear content display.

FIG. 7 is an example three-dimensional character transitioned into a new three-dimensional environment previously shown on the linear content display. Here, the player three-dimensional character 702 has moved closely proximate to and/or jumped "through" the linear content and has now joined a new three-dimensional environment 700 where the character 712 is present. Now, the player three-dimensional character 702 may move about in this new, three-dimensional world and engage with the character 712 or perform other actions associated with this three-dimensional experience within the three-dimensional environment 700 associated with the linear content. Character 712 may be the same as character 602 or may be a different player character (e.g. may become or take the place of a character from the linear content, like John Wick in a John Wick film).

Description of Processes

Figure 8:
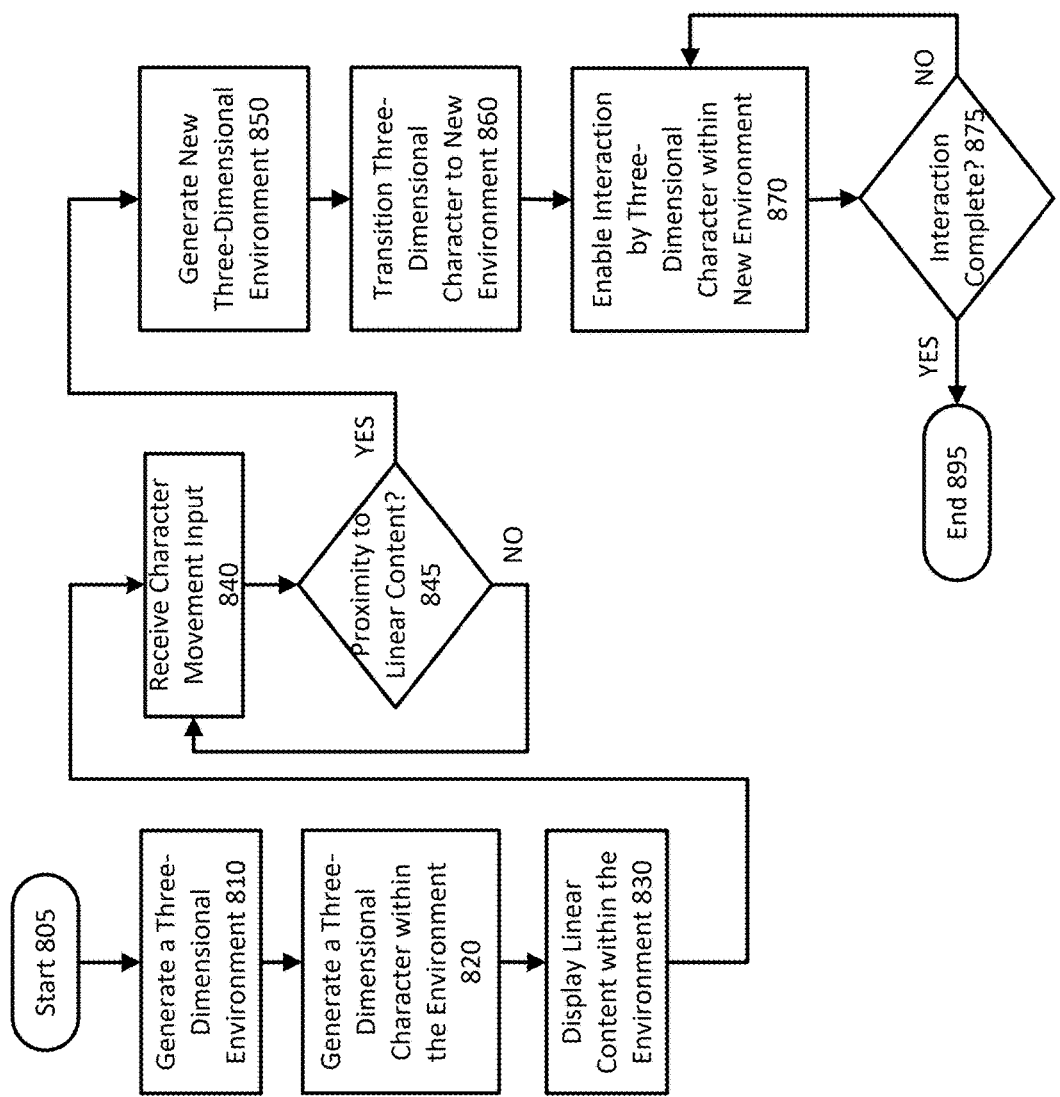
FIG. 8 is a flowchart of a process for linear content transition to a new three-dimensional environment.

FIG. 8 is a flowchart of a process for linear content transition to a new three-dimensional environment. The flow chart has both a start 805 and an end 895, but the process may be cyclical in nature.

After the start, the process begins with the generation of a three-dimensional environment 810. This is preferably handled by the environment server 320 which generates a three-dimensional world into which players may login and interact with the world and each other. This may be in the form of a traditional multiplayer game to which player characters connect using user computing devices (like user computing device 340). However, it may also be in the relatively new form of a multiverse or metaverse style game experience or world to which a player can connect and interact with others and join many and varied sorts of experiences.

Next a three-dimensional character is generated within the environment at 820. This process involves a player using a user computing device 340 to login to the environment server 320 as confirmed by the authentication functions 325. As a result, the environment server 320 and user computing device 340 together generate a uniform three-dimensional environment in which the player three-dimensional character may move about an interact.

Next, linear content is displayed within the environment at 830. Here, the three-dimensional environment itself plays linear content accessed from the content server 330 that may be viewed by a user using one of the user computing devices 340 to connect to the environment server 320. The display shows up within the three-dimensional environment generated at 810. As discussed above, the display may be user-created or may be present at all times within the three-dimensional environment. The linear content displayed may be set by the operator of the three-dimensional environment or may be selected by a player using a user computing device 340. Regardless, the linear content may be associated—e.g. pre-associated by a maker of the linear content or by the operator of the three-dimensional environment—with a given three-dimensional experience, content or other environment into which the player may interact or engage.

Next, the user computing device 340 receives character movement input 840 which is communicated to the environment server 320 to cause the player three-dimensional character to move about within the three-dimensional environment of the world created by the environment server 320. In this way, as player three-dimensional characters move about within the world, the other individuals participating in that world can see those movements and the entire experience is a bit more social, like a "hang out" or busy taking part in activities within the world, while the linear content may be playing nearby or may be being watched as a group together within the three-dimensional environment.

At 845, a determination is made whether the movement at 840 resulted in close proximity to linear content including an associated three-dimensional environment or experience. If not ("no" at 845), then the process continues to check for character movement at 840 that is in proximity to linear content at 845.

If there is character movement that is in close proximity to linear content ("yes" at 845), then this means that the player three-dimensional character has moved close to content having an associated linear content component. This close proximity may be "jumping into" the associated display, moving near it, clicking on it with a mouse or controller, "touching" the display within a virtual reality rendering of the linear content, walking nearby, or engaging in a particular activity or interaction with a nearby element, button, portal, door, or window. In the preferred case, the player three-dimensional character is merely moved into or through the display (e.g. by jumping or running into it).

Thereafter, the environment server 320 generates a new three-dimensional environment 850. This generation may have actually happened previously, or the experience may always be running or generated from the outset of launch of the environment server 320, but this process is shown here because it some cases, the new three-dimensional environment may not exist until such time as it is needed or used by a player three-dimensional character moving into a display or otherwise indicating a desire to engage in the new three-dimensional experience associated with the linear content.

Further in response to the detection by the environment server 320 of proximity to the linear content at 845, the three-dimensional character is transitioned to the new environment at 860. Here, the environment server 320 removes the three-dimensional character from the three-dimensional environment where the linear content is playing and moves them to (adds them to) the new three-dimensional environment associated with the linear content. This process may take the form of a traditional "character loading" process from a technological perspective. The transition is preferably as seamless as possible for the player three-dimensional character, appearing as though they "walk into" the scene of the linear content. However, in some cases, a load time or transition time may be needed. An animation of teleportation or melding into the linear content or other similar transition may be used to mask any load times.

Thereafter, player three-dimensional character interaction with the new three-dimensional environment is enabled at 870. Once the load-in is complete, the player three-dimensional character may move about, interact with, and otherwise engage with the interactive experience within the new three-dimensional environment. This may be accomplished in much the same way as interactions with the original three-dimensional environment is enabled by the environment server 320 operating in concert with the user computing device 340.

Thereafter, the user may take part in the new three-dimensional environment.

At some point, that experience may be complete. For example, the user may complete the mini-game, complete the ordinary game or complete a session with the ordinary game, or may otherwise indicate that he or she is no longer interested in the new three-dimensional experience. For example, a user may move toward, be in close proximity to or jump into an inverse or unusually-colored version of the linear content that continues to play on a wall (suggesting a Through the Looking Glass-like transition between the two worlds) to thereby trigger the same behavior in reverse moving the player three-dimensional character back to the original "world" of the environment server 320.

Once that occurs ("yes" at 875) indicating that the interaction is complete, then the process ends. Until it is complete ("no" at 875) indicating that the interaction is ongoing, then the interaction continues to be enabled at 870.

The process then ends at 895.

In some cases, only steps 830-860 are performed. In some cases, steps 820 and/or 870 are performed with steps 830-860.

Figure 9:
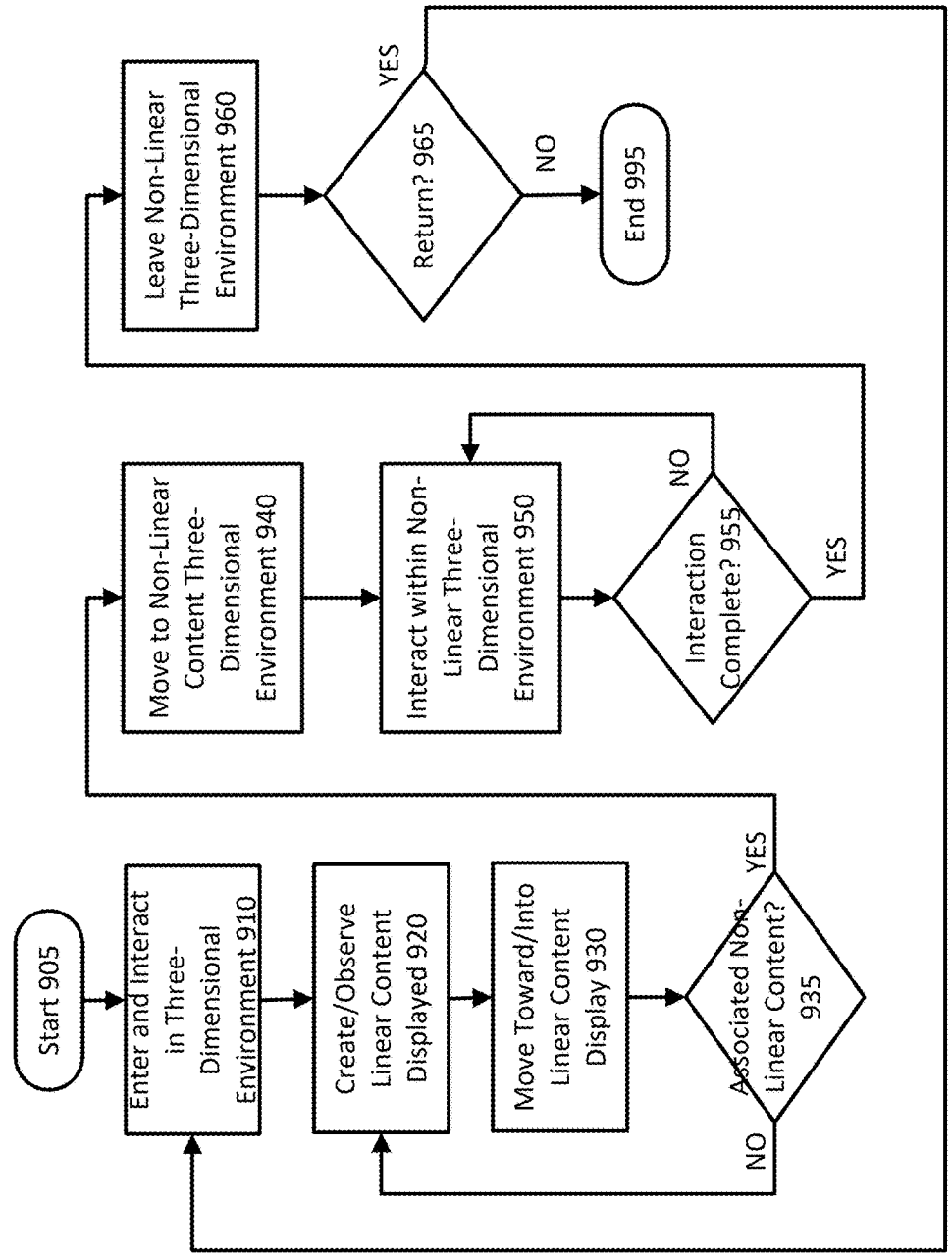
FIG. 9 is a flowchart of a process for linear content transition to a new three-dimensional environment from the perspective of a user.

FIG. 9 is a flowchart of a process for linear content transition to a new three-dimensional environment from the perspective of a user. The flow chart has both a start 905 and an end 995, but the process may be cyclical in nature.

First, following the start 905, the user enters and interacts with a three-dimensional environment created by the environment server 320 and the user computing device 340.

The user may then create and/or observe linear content displayed within the three-dimensional environment at 920. As discussed above, this content may be shown and selected by the three-dimensional environment itself or may be user-selected both in location (e.g. a "pop-up" display) and content (e.g. selecting content from a streaming service, a group of available content or a user's own computer).

After that linear content is playing, the user may move their player three-dimensional character toward, in close proximity to, jump into and/or move into the linear content display at 930. Preferably, this is the walk-into or jump-into interaction, but other interactions are possible.

Next, the system determines whether or not there is associated non-linear content (e.g. a three-dimensional experience) at 935. If not ("no" at 935), then the process continues at 920.

If there is ("yes" at 935), then the process continues with movement to non-linear content three-dimensional environment at 940. Here, the new three-dimensional environment is created or joined by the player's three-dimensional character.

The player's three-dimensional character may interact within that new three-dimensional environment at 950 until that interaction is complete ("no" at 955).

Once that interaction is complete ("yes" at 955), the player's three-dimensional character may leave the non-linear three-dimensional environment that was associated with the linear content at 960.

So long as this is not the end of the play session as a whole ("yes" at 955), then the process continues with return to the original three-dimensional environment at 910. This could be the end of the session as a whole. If so ("no" at 965), then the process ends at 995.

The process then ends at 995.

In some cases, only steps 930-940 are performed. In some cases, steps 920 and/or 950 are performed with steps 930-940.

And, if the linear content and the new three-dimensional environment are closely related or designed together to interact with one another, portions of the linear content associated with the new three-dimensional environment may be altered as a result of player actions within the new three-dimensional environment. So, for example, a player may be given a choice within the three-dimensional environment whether to kill a particular character. If the player chooses to do so, the remainder of the linear content from that point forward may no longer have that character present or characters may react to the player action. If the player chooses not to kill that particular character, then the story of the linear content may adapt accordingly with that character still present in the linear content once the interactions with the new three-dimensional environment are complete. In this way, some linear content the three-dimensional content associated with that linear content may together be interactive in a manner similar to a choose your own adventure book.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for controlling an interactive virtual environment comprising a computing device for:
    generating a three-dimensional computer-generated environment including a player controllable character within the three-dimensional computer-generated environment;
    displaying linear content on a virtual display within the three-dimensional computer-generated environment, the linear content associated with at least one interactive experience, the interactive experience having a location, theme, world, activity, or a character displayed on the virtual display, wherein the linear content lacks interactivity for the viewer;
    receiving input controlling the player controllable character to move the player controllable character into close proximity to the linear content displayed on the virtual display, wherein the input includes the player controllable character one of walking into the linear content displayed, walking through the linear content displayed, jumping into the linear content displayed or jumping through the linear content displayed, and wherein the receiving the input excludes the player controllable character using a device or equipment of the player controllable character;
    generating a second three-dimensional computer-generated environment, the second three-dimensional environment incorporating the location, theme, world, activity, or character of the interactive experience associated with the linear content; and
    transitioning the player controllable character to the second three-dimensional computer-generated environment including the at least one interactive experience associated with the linear content and incorporating the location, theme, world, activity, or character associated with the linear content.

2. The system of claim 1 wherein the computing device is further for moving the player controllable character to a location within the second three-dimensional computer-generated environment.

3. The system of claim 1 wherein the interactive experience is associated with a selected one of a scene, a theme, a world, a character, an activity within the linear content.

4. The system of claim 1 wherein the interactive experience is associated with a particular time frame within the linear content on the virtual display, visual content on the virtual display, one or more characters on the virtual display, a scene on the virtual display, one or more objects or products on the virtual display.

5. The system of claim 1 wherein the linear content is a film, movie, television program, television series, trailer for other content, or short.

6. The system of claim 1 further comprising a second computing device for:
    generating a second three-dimensional computer-generated environment including a second player controllable character within the second three-dimensional computer-generated environment;
    displaying the linear content on a second virtual display presented within the second three-dimensional computer-generated environment, the linear content associated with at least one interactive experience, the interactive experience having a location, theme, world, activity, or a character displayed on the virtual display;

receiving input controlling the second player controllable character to move the player controllable character into close proximity with to the linear content displayed on the second virtual display; and generating the second three-dimensional computer-generated environment, the second three-dimensional environment incorporating the location, theme, world, activity, or character of the interactive experience associated with the linear content;

transitioning the second player controllable character to the second three-dimensional computer-generated environment including the at least one interactive experience associated with the linear content.

7. The system of claim 1 wherein the linear content is altered based upon actions taken by the player controllable character within the at least one interactive experience associated with the linear content.

8. The system of claim 1, wherein the linear content is a previously-recorded content with a beginning point and an end point.

9. A method for controlling an interactive virtual environment using a computing device, the method comprising:

generating a three-dimensional computer-generated environment including a player controllable character within the three dimensional computer-generated environment;

displaying linear content on a virtual display presented within the three-dimensional computer-generated environment, the linear content associated with at least one interactive experience, wherein the linear content lacks interactivity for the viewer;

receiving input controlling the player controllable character to move the player controllable character into close proximity to the linear content displayed on the virtual display, wherein the input includes the player controllable character one of walking into the linear content displayed, walking through the linear content displayed, jumping into the linear content displayed or jumping through the linear content displayed, and wherein the receiving the input excludes the player controllable character using a device or equipment of the player controllable character;

generating a second three-dimensional computer-generated environment; and transitioning the player controllable character to the second three-dimensional computer-generated environment including the at least one interactive experience associated with the linear content and incorporating the location, theme, world, activity, or character associated with the linear content.

10. The method of claim 9 wherein the method further comprises moving the player controllable character to a location within the second three-dimensional computer-generated environment.

11. The method of claim 9 wherein the interactive experience is associated with a selected one of a theme, a world, a character, an activity within the linear content.

12. The method of claim 9 wherein the interactive experience is associated with a particular time frame within the linear content on the virtual display, visual content on the virtual display, one or more characters on the virtual display, one or more objects or products on the virtual display.

13. The method of claim 9 wherein the linear content is a film, movie, television program, television series, trailer for other content, or short.

14. The method of claim 9 further comprising using a second computing device to:

generate a second three-dimensional computer-generated environment including a second player controllable character within the second three-dimensional computer-generated environment;

display the linear content on a second virtual display presented within the second three-dimensional computer-generated environment, the linear content associated with at least one interactive experience;

receive input controlling the second player controllable character to move the player controllable character into close proximity with to the linear content displayed on the second virtual display; and generate the second three-dimensional computer-generated environment transitioning the second player controllable character to the second three-dimensional computer-generated environment including the at least one interactive experience associated with the linear content.

15. The method of claim 9 wherein the linear content is altered based upon actions taken by the player controllable character within the at least one interactive experience associated with the linear content.

16. Apparatus comprising non-volatile machine-readable medium storing a program having instructions which when executed by a processor will cause the processor to:

generate a three-dimensional computer-generated environment including a player controllable character within the three dimensional computer-generated environment;

display linear content on a virtual display presented within the three-dimensional computer-generated environment, the linear content associated with at least one interactive experience, the interactive experience having a location, theme, world, activity, or a character displayed on the virtual display, wherein the linear content lacks interactivity for the viewer;

receive input controlling the player controllable character to move the player controllable character into close proximity to the linear content displayed on the virtual display, wherein the input includes the player controllable character one of walking into the linear content displayed, walking through the linear content displayed, jumping into the linear content displayed or jumping through the linear content displayed, and wherein the receiving the input excludes the player controllable character using a device or equipment of the player controllable character;

generate a second three-dimensional computer-generated environment, the second three-dimensional environment incorporating the location, theme, world, activity, or character of the interactive experience associated with the linear content; and transition the player controllable character to the second three-dimensional computer-generated environment including the at least one interactive experience associated with the linear content and incorporating the location, theme, world, activity, or character associated with the linear content.

17. The apparatus of claim 16 wherein the steps further cause the processor to move the player controllable character to a location within the second three-dimensional computer-generated environment.

18. The apparatus of claim 16 wherein the interactive experience is associated with a selected one of a theme, a world, a character, an activity within the linear content.

19. The apparatus of claim 16 wherein the linear content is a film, movie, television program, television series, trailer for other content, or short.

20. The apparatus of claim 16 wherein the linear content is altered based upon actions taken by the player controllable character within the at least one interactive experience associated with the linear content.

21. The apparatus of claim 16 further comprising:
the processor; and
a memory,
wherein the processor and the memory comprise circuits and software for performing the instructions on the storage medium.

* * * * *